July 4, 1939.  W. L. MORRISON  2,164,341
WINDOW FOR VEHICLES
Filed Dec. 5, 1932  2 Sheets-Sheet 1
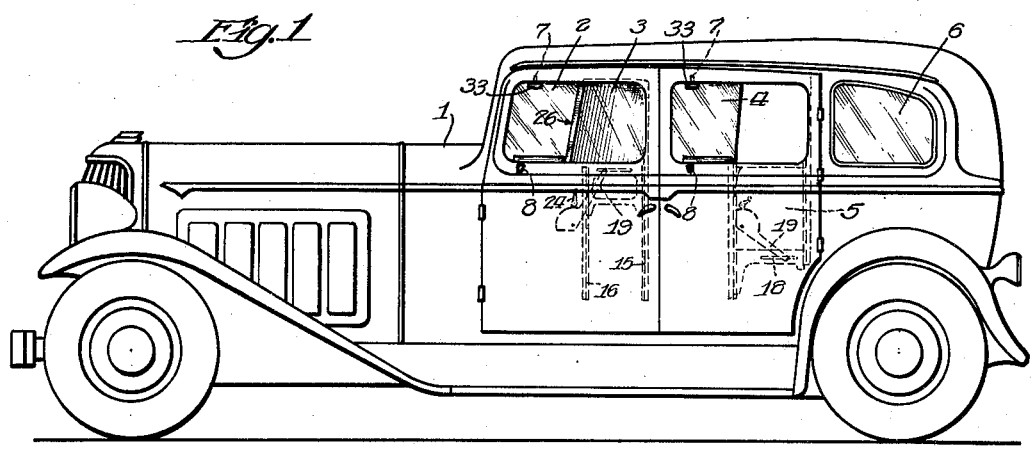
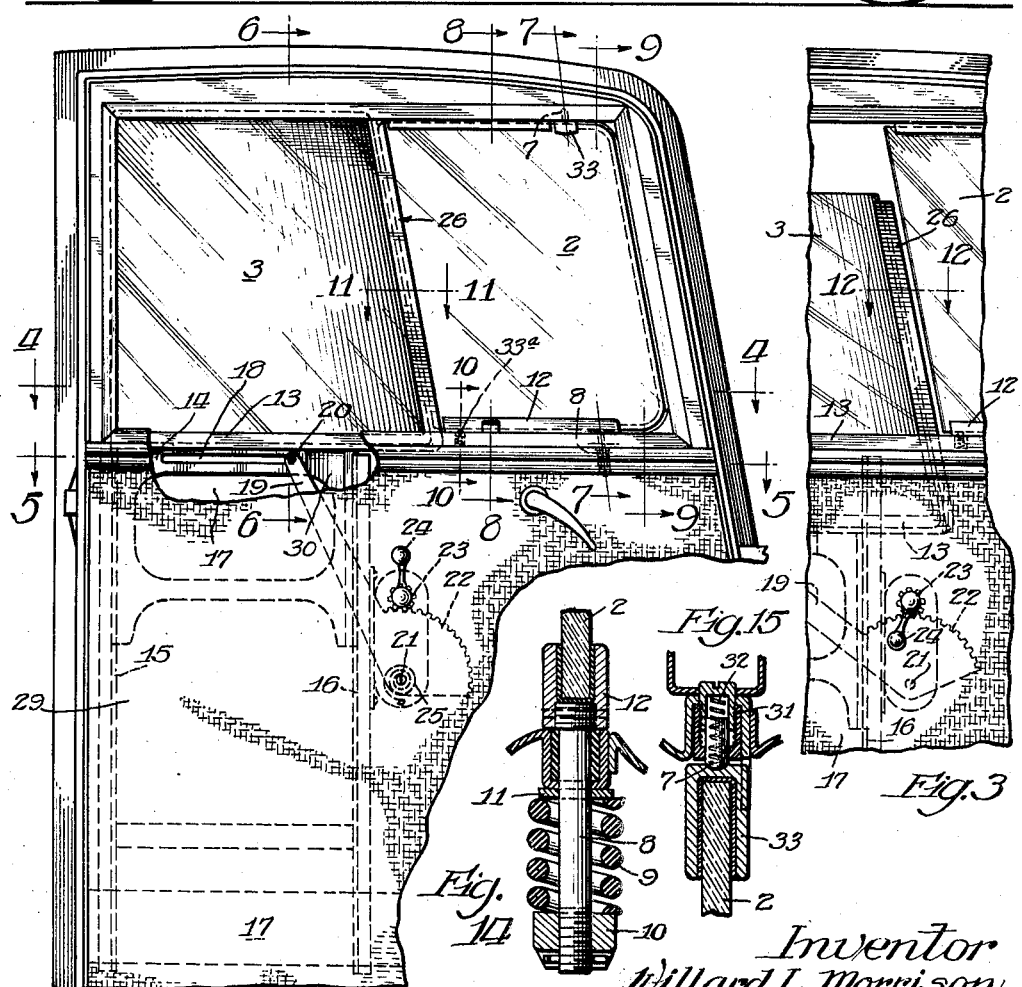
Inventor
Willard L. Morrison
By Parker Carter
Attys.

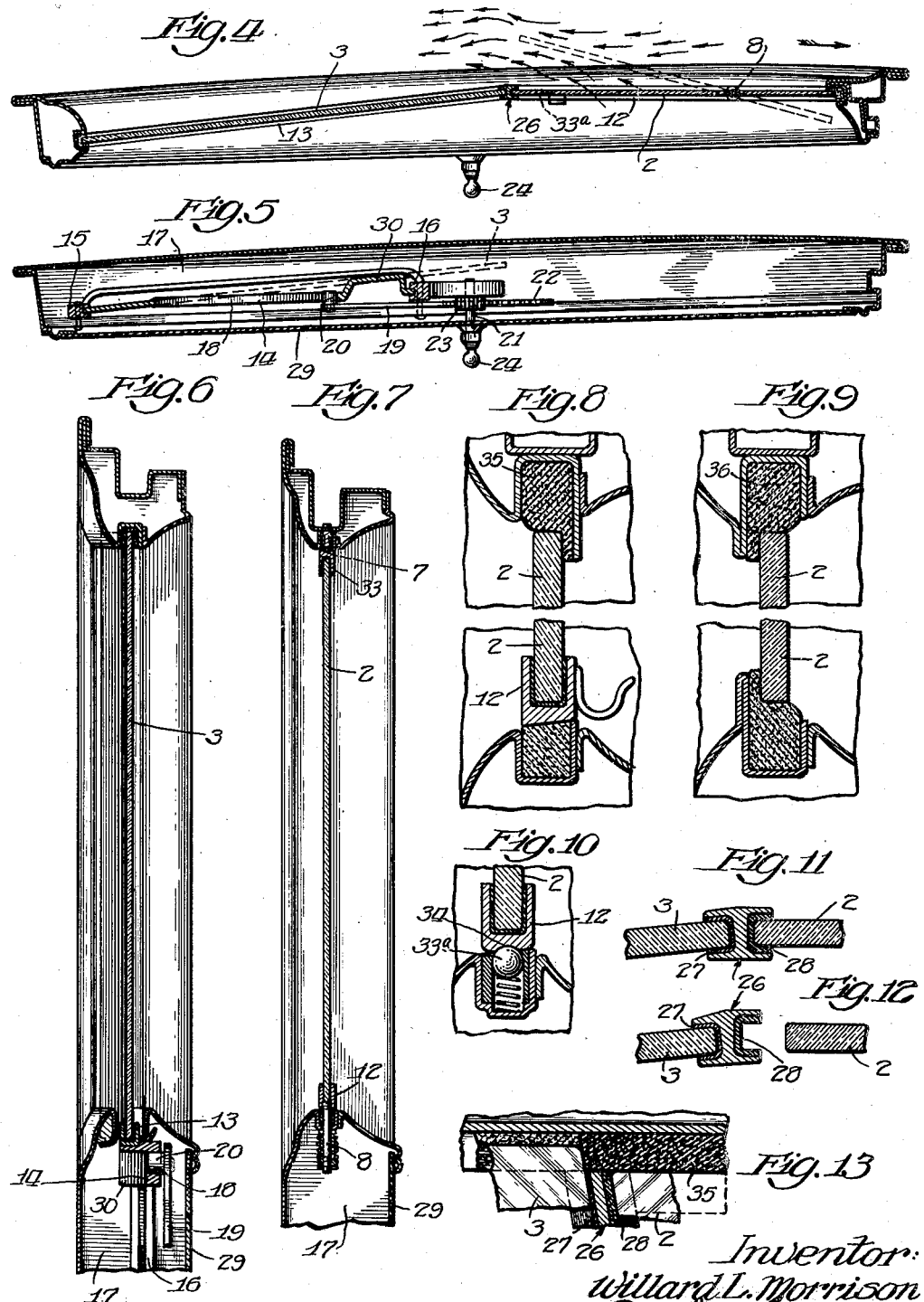

Patented July 4, 1939

2,164,341

UNITED STATES PATENT OFFICE 2,164,341

WINDOW FOR VEHICLES

Willard L. Morrison, Chicago, Ill.

Application December 5, 1932, Serial No. 645,687

2 Claims. (Cl. 296—44)

This invention relates to windows for vehicles and has for its object to provide a new and improved device of this description. The invention has as a further object to provide a window for a vehicle made up in sections, one section adapted to be moved out of the way, and the other section adapted to be used as an air deflector. The invention has further objects which are more particularly pointed out in the accompanying description.

Referring now to the drawings, Fig. 1 is a view showing a vehicle provided with windows embodying the invention;

Fig. 2 is an inside view of one of the windows illustrated in Fig. 1;

Fig. 3 is an inside view of the abutting edges of the sections of the windows shown in Fig. 2;

Fig. 4 is an enlarged sectional view taken on line 4—4 of Fig. 2;

Fig. 5 is an enlarged sectional view taken on line 5—5 of Fig. 2;

Fig. 6 is an enlarged sectional view taken on line 6—6 of Fig. 2;

Fig. 7 is an enlarged sectional view taken on line 7—7 of Fig. 2;

Fig. 8 is an enlarged sectional view with parts broken away taken on line 8—8 of Fig. 2;

Fig. 9 is an enlarged sectional view with parts broken away taken on line 9—9 of Fig. 2;

Fig. 10 is an enlarged sectional view taken on line 10—10 of Fig. 2;

Fig. 11 is an enlarged sectional view taken on line 11—11 of Fig. 2;

Fig. 12 is an enlarged sectional view taken on line 12—12 of Fig. 2;

Fig. 13 is an enlarged view of the upper edge of the window where the edges meet, with parts broken away;

Fig. 14 is a sectional view through the lower pivotal construction 8. Fig. 15 is a sectional view through the upper pivotal construction 7.

Like numerals refer to like parts throughout the several figures.

Referring now to the drawings, I have illustrated a vehicle 1 having window openings. The front window opening is provided with a window made up of two sections 2 and 3. The rear window opening is provided with a window made up of two sections 4 and 5. The rear window 6 consists of a single section. The two forward windows, as herein shown, are in the doors of the vehicle. The forward sections 2 and 3 of the window are pivotally connected in position by means of the pivots 7 and 8 near the forward edge thereof so that they may be moved outwardly to act as air deflectors. Some suitable means is provided for maintaining them in any desired position. It will be noted that the front of the vehicle is inclined, the inclination being rearwardly from the bottom portion toward the top portion and that the front edge of the section 2 is similarly inclined. It will further be noted that the top pivot 7 and the bottom pivot 8 are connected to the section 2 at a distance from its front edge and that they are not in vertical aligning, but that a line joining them runs substantially parallel with the front edge of the pivoted section. This gives certain important advantages. When the pivoted section 2, for example, has its rear end moved outwardly the front end, because of this position of the pivots, moves inwardly and this gives a ventilating space at the front edge of the section 2 through which air is drawn. On the other hand, if the rear end of the section 2 is moved inwardly the front end of the section 2 is moved outwardly so as to act to scoop air into the vehicle. Furthermore, this construction gives a more effective deflector, for with any given width of the deflector it permits more of the deflector to project beyond the car than if the pivots were in vertical alignment. This will be readily seen in examining Fig. 2. If a vertical line is drawn from the upper pivot 7 to the bottom of the section 2, it will be seen that it is a considerable distance to the rear of the pivot 8, and so when the rear end of the deflector is moved outwardly it is only the distance from this point to the rear edge that projects beyond the vehicle, whereas in applicant's device the distance is the distance from the pivot 8 to the rear edge.

As herein shown the pivot 8 has a frictional device associated therewith so that friction may be utilized to maintain the window section in any desired annular position. This frictional device, as illustrated, is provided by using a spring 9 surrounding the pivot 8, there being a nut 10 so that the spring may be compressed between this nut and the washer 11 on the pivot. The pivot is fastened to the frame 12 of the window section. The pressure of the spring pulls the pivot downwardly and makes a frictional contact between the moving parts which hold the window section in any desired position to which it is moved.

The section 3 is arranged to be moved down into a pocket below the window opening. For this purpose there is attached to the frame member 13 of the window section a controlling member 14 which also acts as a guide and which operates in guides 15 and 16 in the pocket or receptacle 17 below the window opening. This controlling member is provided with a slot 18. An arm 19 is provided with a pin 20 which works in the slot 18. The arm 19 is pivoted at 21 to a fixed part and is provided with a gear segment 22, the teeth of which are engaged by a pinion 23 connected with the crank 24. A spring 25 is preferably provided, having one end connected with a stationary part and the other end connected with the arm 19 and which tends to maintain the window section 3 in its up position.

Some means is provided for sealing the space between the abutting edges of the window sections 2 and 3 and 4 and 5. In the construction shown there is a sealing member 26. This sealing member may be connected with either window section, but I have shown it in connection with the section 3 which moves up and down. The sealing member consists of a metal or rigid member, preferably having an I cross-section. The section 3 of glass is inserted in the space at one side of the central portion of the sealing device, and there is preferably a sealing piece 27 of soft material. There is also a sealing piece 28 on the other side of the sealing device, having a slot into which the section 2 of the window fits when the window is closed. It will be noted that the abutting edges of the sections 2 and 3 of the window are inclined so that when the section 3 is moved downwardly it will move away from the section 2, and therefore separate the two sections by disconnecting the sealing device from one of them, as clearly shown in Fig. 3. This disconnection is preferably made when the section 3 is moved down only a short distance. The section 2 may now be moved about its pivots so as to be moved to any desired air deflecting position.

I prefer to have the sections 3 and 5 at an angle to the sections 2 and 4, as clearly shown in Fig. 4. Under these conditions when the sections 2 and 4 are moved out to their air deflecting position air is withdrawn from the car, as indicated in said Figure 4. The operation is greatly facilitated by inclining these sections 3 and 4. When this inclined position is used, the controlling member 14 is preferably arranged so it is not parallel with the glass, but is parallel with the wall 29 of the door, see Fig. 5, for the length of the slot 18, so that there will be no binding of the parts. There is a bent portion 30, see Fig. 5, beyond the slot which engages the glass, as herein illustrated. The pivots 7 may be arranged in any desired manner. I prefer, however, to arrange them as shown in Fig. 15, wherein they are located in a housing 31 in the window frame and are provided with a spring 32 which presses them into a notch in the part 33 attached to the window section.

I also prefer to provide some means for maintaining the window sections 2 and 4 in proper position so that when the sections 3 and 5 are moved up, the sealing device will be in proper position to seal the space between them. This may be done by the construction shown in Fig. 10 wherein there is a spring pressed member 33 in the window frame which engages a notch 34 in the framing member 12 of the window section, so that when the sections 2 and 4 are moved inwardly this member 31 springs down and then springs up into the notch 34 so as to hold the window in this position. It also gives the indication to the driver that the window section is in the proper position.

There is provided sealing means at the top and bottom for sealing the edges of the glass sections. The glass sections 2 and 4, for example, are arranged so that the rear portion, when being moved to the closed position, moves in one direction and the front portion in the opposite direction. The sealing devices in front of and back of the pivots, therefore, must be oppositely arranged, and this is shown in Figs. 8 and 9. In Fig. 8, which shows the sealing device at the rear of the pivot, that is toward the rear of the vehicle, the sealing device 35 is arranged so that the glass section 2 comes against the sealing edge, the sealing edge being at the right of it. In Fig. 9, which shows the sealing device in front of the pivot, this sealing device 36 is arranged so that its sealing edge is at the left of the glass. By this means the edges of the glass are properly sealed when the section is moved to its closed position.

I claim:

1. A window for vehicles comprising a sliding section, means for sliding the sliding section downwardly, said means comprising a controlling member connected with the sliding section shorter than the bottom edge of the window and having elongated guiding parts thereon spaced apart but rigidly connected together, guides below the window opening into which said elongated guiding parts are received one guide and guiding member being intermediate the two edges of the window, a slot in said controlling member, an arm having a pin working in said slot, said arm pivoted to a fixed part, and means for rocking said arm about its pivot to raise and lower said section.

2. A window for vehicles comprising a sliding section, means for sliding the sliding section downwardly, said means comprising a controlling member connected with the sliding section elongated guiding parts associated with said window section and spaced apart, a rigid connection between said elongated guiding parts, elongated guides below the window opening into which said elongated guiding parts are received and with which they have extended guiding contact, one of said guiding parts being at one side of the plane of said sliding section, the other guiding part being in the plane of said sliding section, a slot in said controlling member, an arm having a pin working in said slot, said arm pivoted to a fixed part, the end of said arm farthest from said controlling member being at one side of both of said guides, a crank at one side of both of said guides operatively connected with said arm so as to rock it about its pivot to raise and lower said section.

WILLARD L. MORRISON.